Inventor
James M. Carswell.
by Douglas S. Johnson
agent

May 5, 1953

J. M. CARSWELL 2,637,166

PURE REACTION TURBINE WITH EVACUATED
CHAMBER AND ROTOR ELEMENT THEREFOR

Filed Oct. 7, 1948

Inventor
James M. Carswell.
by Douglas S. Johnson
agent

Patented May 5, 1953

2,637,166

UNITED STATES PATENT OFFICE 2,637,166

PURE REACTION TURBINE WITH EVACUATED CHAMBER AND ROTOR ELEMENT THEREFOR

James M. Carswell, Toronto, Ontario, Canada

Application October 7, 1948, Serial No. 53,313

6 Claims. (Cl. 60—39.35)

This invention relates to a power plant or turbine in which the reactions of high velocity jets are utilized to affect the rotation of the turbine rotor, and the principal object of the invention is to provide a pure reaction turbine which will operate as a prime mover at high speeds with an exceedingly high efficiency to provide an effective practical power plant.

A further and important object is to reduce to a minimum the dissipation of energy from the rotating element or blade to the surrounding atmosphere.

A further and very important object is to provide a pure reaction turbine in which the rotor or blade can safely withstand the extremely high stresses resulting from the high peripheral velocities to which it must be subjected to effectively utilize the energy of the jet reactions.

A still further important object is to provide a novel form of rotating element or blade in which the tips form the combustion chambers constructed in such a manner to permit the flow of fuel thereto and to at the same time withstand the high centrifugal stresses to which it is subjected.

The principal feature of the invention consists in providing a jet reaction rotor or blade element formed with combustion chambers at the tips thereof and connected with a fuel supply and having jet nozzles leading therefrom to direct the products of combustion from the tips in opposite directions to provide a high torque reaction; and rotatably arranging the blade element within a chamber maintained at a partial vacuum to permit the blade to rotate with the minimum of dissipation of energy to the surrounding atmosphere at the high speeds required to efficiently utilize the reaction of the jets.

A further and important feature consists in forming the blade element of a shape to provide substantially uniform unit stress on the blade elements from the centre to the tip to enable the blade to withstand the large centrifugal stresses developed at the high rates of speed to which the blade is subjected.

A still further important feature consists in defining the combustion chambers provided at the blade tips by a pair of spaced curved walls forming the tip of the blade and shaped to correspond to the shape assumed by a flexible membrane hanging in a centrifugal field of force to eliminate bending stresses therein under rotation.

A still further feature consists in providing passages in the spaced walls at the blade tips to conduct fuel into the combustion chamber defined thereby.

Referring to the accompanying drawings.

The concept of effecting the rotation of a blade or equivalent element through the utilization of the reactive force of jets has long been known. The factors which have prevented the incorporation of this principle into a practical power plant or engine have been mainly the high peripheral velocity necessary to efficiently utilize the reaction of the jets and the high dissipation of energy to the surrounding air.

In considering the first-mentioned factor of high peripheral velocity, the normal blade element familiar to the aircraft or other conventional machines has limitations in the centrifugal stress it can endure and hence is not adaptable for operation with the type of pure reaction turbine with which this invention is concerned.

It is well understood that the use of jet reactions necessitates that the speed of the moving element be high to obtain the desired efficiency from the reactive force. This means that to obtain the efficiency required to render the use of jet reaction in a practical engine the rotating element in moving through the atmosphere at its high rate of speed must necessarily dissipate a substantial portion of its energy to the surrounding air.

It is the purpose of this invention to eliminate this high loss of energy and to provide a blade element which will withstand the destructive forces to which it is subjected in the efficient use of jet reactions.

It is a further purpose of the invention to form the combustion chambers for exploding the fuels to provide the jet discharge at the tips of the blade and utilizing passages in the blade to conduct the raw fuel to the tips under centrifugal pressure so that the maximum reactive force obtained at the point of explosion at the blade tips will act directly to provide the maximum torque resultant.

Figure 2:
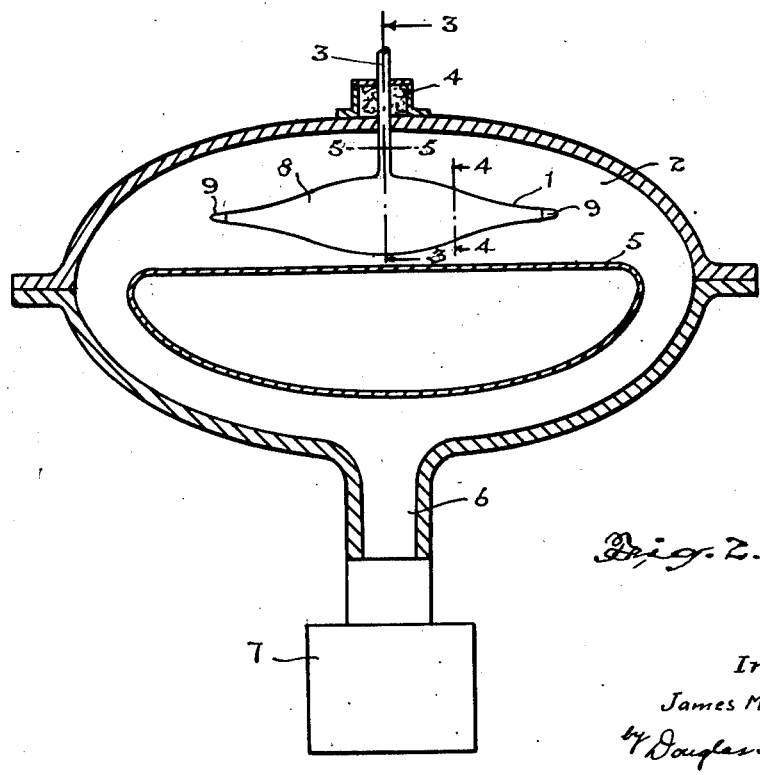
Figure 2 is a vertical mid-sectional view illustrating a turbine unit constructed in accordance with my invention and presented in its simplest form.

Referring to the accompanying drawings, I illustrate my invention in its simplest form for clarity, and as illustrated, particularly in Figure 2, I arrange my rotor or blade element generally designated at 1 within a casing or chamber 2. The blade is supported on the end of a hollow shaft 3 journalled in the wall of the chamber 2 with the shaft extending through a suitable packing gland 4.

Arranged within the chamber is a guide or deflector plate 5 which acts to conduct the hot products of combustion issuing from the blade element back along the blade and through an extended path before issuing from the outlet 6 which is connected to a suitable pump or exhauster 7 illustrated in Figure 2 in block form, which is arranged to maintain a partial vacuum in the chamber.

Figures 3, 5:
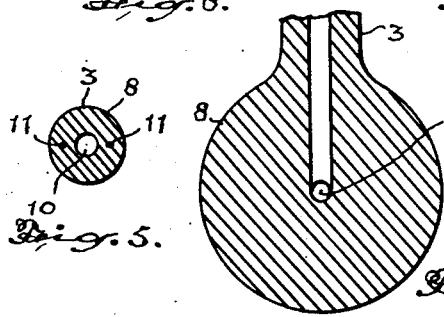
Figure 3 is an enlarged sectional view of the blade element taken on the line 3—3 of Figure 2.
Figure 5 is an enlarged section on the line 5—5 of Figure 2.
Figure 4:
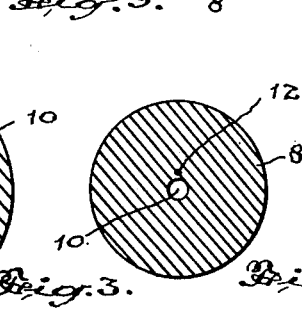
Figure 4 is an enlarged section on the line 4—4 of Figure 2.

The blade 1 consists of a body portion 8, the details of which are shown in Figures 3 to 5, and the tip portions 9, details of which are shown in Figures 6 to 10. Leading from the hollow shaft 3 is a central passage 10 which leads to the blade tips 9 and serves to conduct compressed air introduced into the hollow shaft to the blade tips.

Extending through the hollow shaft 3 are a pair of fuel passages 11 which lead from a fuel supply, not shown. These passages 11 communicate with the radially extending fuel passages 12 which conduct the fuel from the shaft to the blade tips.

Referring to Figures 3 and 4 and 1 and 2, it will be seen that the body portion 8 of the blade is shown as circular in cross section, but may be any shape provided that the area of cross section at the section being considered is equal to $Ae^{-x^2}$ where $A$ is the cross sectional area of the blade at the axis of rotation, and where $x$ is the distance along the axis of the blade measured in appropriate units. The shape of the blade cross section varies in any arbitrary fashion from circular at the axis of rotation to rectangular at the tip to which the combustion chamber is attached, the area, however, varying as $e^{-x^2}$ as noted above.

The resultant variation in area outwardly from the blade shaft is such that the axial stress due to centrifugal force is constant from the base or shaft to the tip, that is, the variation in cross sectional area outwardly from the shaft of the blade corresponds inversely to the variation of the magnitude of the centrifugal force outwardly of the shaft, with the result of constant axial stress through the blade element.

With such a construction the maximum strength of blade is obtained and the blade will withstand the resultant centrifugal stresses produced at extremely high rates of rotation up to and over tip speeds of 4000 feet per second.

The tip portion 9 of the blade forms the combustion chamber and jet nozzle.

Figure 1:
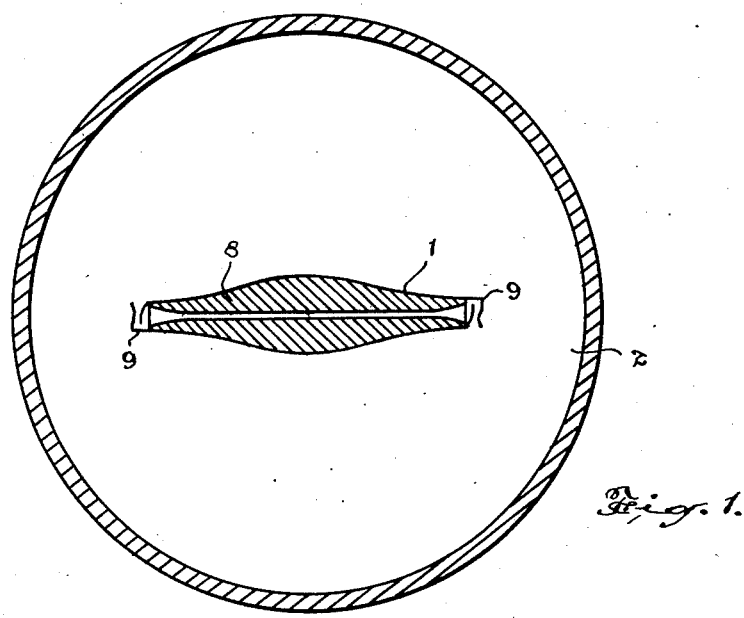
Figure 1 is a sectional plan view taken through the horizontal mid-plane of the rotating blade element constructed in accordance with my invention and showing it arranged within its evacuated chamber.
Figure 6:
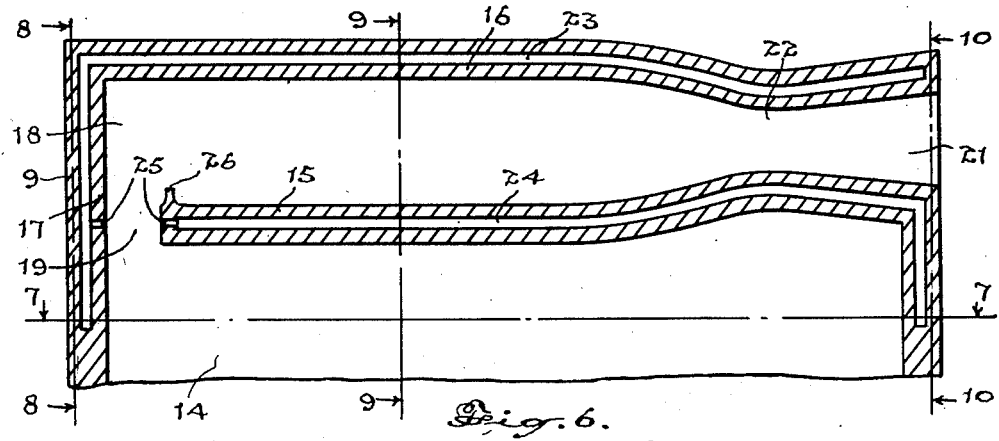
Figure 6 is a greatly enlarged plan sectional view of the tip of my rotating blade element.
Figure 7:
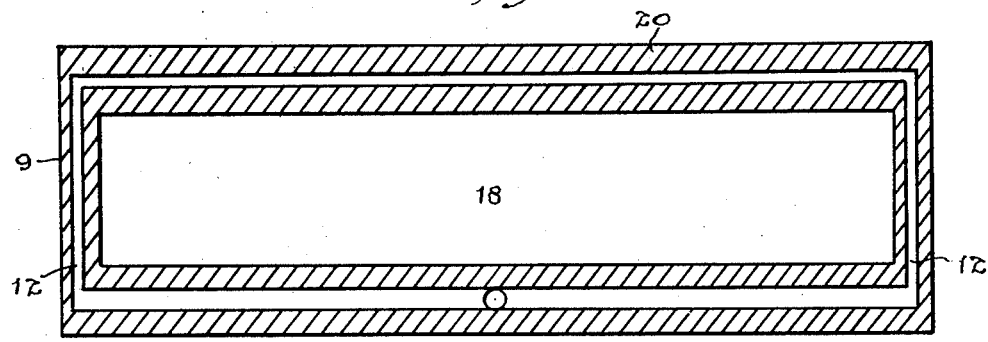
Figure 7 is a sectional view taken on the line 7—7 of Figure 6.

Referring to Figure 6, which is an enlargement of the tip of the blade element as seen in plan section Figure 1, it will be seen that the blade tip is hollow to provide an enlarged chamber 14 into which the central air passage 10 leads. Extending inwardly from one side of the hollow tip portion 9 is a transverse partition 15 which extends transversely across the width of the tip portion and parallel to the end wall 16.

The partition 15 terminates short of the opposite side wall 17 and defines with the end wall 16 a combustion chamber 18 in communication through the opening 19 between the end of the partition and the side wall 17 with the chamber 14.

Opening outwardly from the combustion chamber 18 through the side wall 20 is the jet discharge mouth 21 to discharge the products of combustion from the combustion chamber which are directed through the restricted neck 22 defined by the partition 15 and endwall 16 adjacent the mouth 21.

Figures 8, 9, 10:
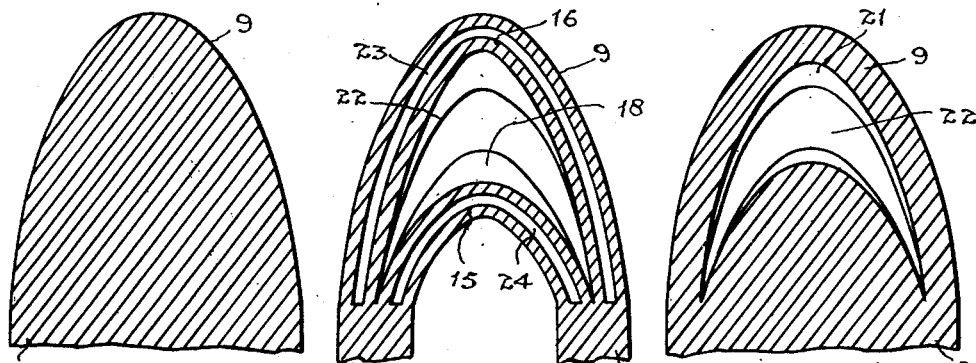
Figure 8 is a section on the line 8—8 of Figure 6.
Figure 9 is a section on the line 9—9 of Figure 6.
Figure 10 is a section on the line 10—10 of Figure 6.

The shape of the partition 15 and end wall 16, as clearly shown in Figure 9, corresponds to the catenary-like shape that would be assumed by a flexible membrane hanging freely in a centrifugal field of force between opposing blade side walls and extending transversely of the blade tip. This catenary-like shape is extremely important as it eliminates all bending stresses in these walls as the blade element rotates, permitting the blade tip to be designed with consideration only to axial tension stresses, and permitting the walls 15 and 16 to be made relatively thin.

As shown in Figures 6 and 9, both the partition 15 and end wall 16 have passages 23 and 24 respectively formed therein so that in effect these wall members are of hollow construction.

Again the essentialness of having the particular wall shape illustrated in Figure 9 to permit hollow walls of practical dimensions to be utilized is emphasized.

These passages, 23 and 24, communicate with the radially extending fuel passages 12 formed in the body of the blade and carry the fuel to the combustion chamber 18 into which it is injected through suitable fuel jets 25.

It will be seen on reference to Figure 1, of course, that the nozzles at the blade tips are arranged to direct the resultant products of combustion from the combustion chambers in opposite directions to provide, through their reaction, the desired torque.

It will thus be understood in reference to Figures 2 and 6 that air or oxygen, delivered under pressure through the hollow shaft 3 will flow through the passage 10 to the tip chambers 14, and through the opening 19 into the combustion chamber where it will be mixed with the preheated fuel fed under pressure through the passages 11 and 12, and 23 and 24 to the fuel jets 25.

Various well known ignition systems may be employed for igniting the rich combustible atmosphere produced in the fuel chamber by the mixing of the compressed air and fuel thrown out by the jets 25.

As the details of such ignition systems form no part of the present invention they are omitted from the drawing. However, for optimum operation I utilize the "glow plug" principle of aiding combustion by providing at the end of the partition 15 a small metal projection 26 which extends into the combustion chamber 18. This projection becomes, and remains, hot under the ignition of the mixture introduced into the combustion chamber and serves to efficiently aid and maintain combustion.

As explained, under operation, the fuel is circulated through the hollow tip walls 15 and 16 defining the combustion chamber and the heat conducted through the inner surfaces of these walls is taken up by the incoming fuel and returned to the chamber. This action effects both the cooling of the inner surfaces of the end walls, but also returns the heat to the system to provide regenerative fueling.

The fuel may be delivered to the blade under pressure, but a positive outward feed of the fuel to the blade tips is maintained by the outward force on the fuel due to the rotative action of the blade and the positive stream of preheated fuel into the combustion chamber is assured. The high centrifugal force acting on the liquid will further aid in the production of a combustible mixture in the combustion chamber by breaking up the fuel stream issuing from the jets 25 into a finely atomized column which can be instantly vapourized under the heat of the chamber.

As the jets of high velocity gases issue from the nozzles or discharge mouths 21 the blade element will be rotated at an extremely high speed.

The energy translated from its blade to its shaft 3 may be utilized to drive the pump or exhauster 7 to exhaust the air from the chamber or casing 2. As explained, this elimination of the air surrounding the blade eliminates the high dissipation of energy through air friction, and further eliminates turbulence in the blade area, and permits the jets to issue steadily and smoothly to provide a smooth and steady reactive force.

The energy required to drive the exhauster 7 is small in comparison with the losses that would be encountered in operating the blade under normal atmospheric conditions, and further, the operation of the blade in a partial vacuum eliminates to a great extent the torsional and other destructive stresses.

It will be noted from Figure 2 that the products of combustion issuing from the nozzles 21 do not directly emerge through the outlet 6, but are deflected by the deflector or guide 5.

It will be seen that a portion of these hot gases are directed past the blade element in close contact therewith, and effect a transference of their heat to the blade element and to the combustible fuel fluids flowing to the tip combustion chambers, thus heat losses from the system are further reduced to maintain the efficiency of the unit.

It will be appreciated that with the blade constructed as described to provide constant stress throughout the blade it may be operated at extremely high rates of speed without self destruction, and the use of the particularly shaped combustion chamber walls 15 and 16 to provide a "hanging wall" combustion chamber nozzle permits a tip of practical construction to be obtained. Such a rotating blade element, driven by the reaction of oppositely directed jets issuing from the tip discharge chambers, provides a practical pure reaction turbine which will operate as an efficient prime mover to produce an output torque and horsepower that may be harnessed to provide an important advance in turbine design conceptions, and opening up an entirely new field of engine design.

What I claim as my invention is:

1. A jet reaction type rotor comprising a blade element having spaced transverse walls formed at each of the tips of said blade and defining a combustion chamber therebetween, said walls having a catenary-like shape corresponding to the shape assumed by a flexible member hanging in a centrifugal field of force between opposing side walls of said blade to eliminate bending moments in said walls under rotation of said blade, discharge openings formed at the tips of said blade and communicating with said combustion chamber to direct products of combustion therefrom to effect the rotation of said blade, and passageways formed in said shaft and blade to conduct combustibles to said combustion chambers.

2. A jet reaction type rotor comprising a blade element having a cross sectional area reducing exponentially outwardly from the axis of rotation whereby the axial stress in said blade due to centrifugal force is constant throughout said blade, spaced transverse walls formed at each of the tips of said blade and defining a combustion chamber therebetween, said walls having a catenary-like shape corresponding to the shape assumed by a flexible member hanging in a centrifugal field of force between opposing side walls of said blade to eliminate bending moments in said walls under rotation of said blade, discharge openings formed at the tips of said blade and communicating with said combustion chamber to direct products of combustion therefrom to effect the rotation of said blade, and passageways formed in said shaft and blade to conduct combustibles to said combustion chambers.

3. A device as claimed in claim 2, in which said spaced transverse walls defining said combustion chambers are hollow with the interiors thereof in communication with one of said passageways forming the fuel supply passage whereby fuel is delivered to said combustion chamber through said spaced hollow walls, fuel jets communicating between said hollow walls and said combustion chambers to inject fuel from said walls into said chamber.

4. A device as claimed in claim 2 in which said spaced walls defining said combustion chambers are hollow and said passageways for combustibles comprise an air supply passage leading directly to said combustion chamber at each end of said blade, and a fuel supply passage in communication with the hollow walls of each of said combustion chambers, discharge openings formed through said hollow walls to effect the injection of fuel therefrom into said combustion chambers following circulation of the fuel through said walls to be preheated by heat passing from said combustion chamber to said walls.

5. In a high speed pure reaction turbine, a blade element having a cross sectional area reducing exponentially outwardly from the centre thereof at a rate of $e^{-x^2}$ where $x$ is the distance of the cross section along the blade from the centre whereby the axial stress in said blade due to a centrifugal force is constant throughout said blade, spaced transverse walls formed at each of the tips of said blade defining a combustion chamber therebetween, said walls having a catenary-like shape corresponding to the shape assumed by a flexible member hanging in a centrifugal field of force between opposing side walls of said blade to eliminate bending moments in said walls under rotation, discharge openings formed in the tips of said blade and communicating with said combustion chambers to direct products of combustion therefrom to effect the rotation of said blade, and passageways formed in said blade to conduct combustibles to said combustion chamber.

6. A pure reaction turbine, comprising an air seal casing, a jet reaction rotor element rotatably mounted within said casing and suction means external of said casing communicating therewith to evacuate air from said casing to provide an atmosphere in which the rotor element rotates substantially free from fluid resistance to permit said rotor element to rotate at speeds at which the jet reaction of the rotor may be efficiently utilized said jet reaction rotor discharging unresisted into said evacuated chamber to provide a driving reactive thrust on said rotor, and said suction means conveying away products of discharge to maintain said chamber evacuated.

JAMES M. CARSWELL.

References Cited in the file of this patent

FOREIGN PATENTS

| Number | Country | Date |
| --- | --- | --- |
| 366,450 | Great Britain | Mar. 3, 1932 |
| 440,500 | Great Britain | Jan. 1, 1936 |
| 537,286 | Great Britain | June 16, 1941 |
| 339,847 | France | Apr. 28, 1904 |
| 648,107 | France | Aug. 7, 1928 |
| 179,128 | Germany | Dec. 1, 1906 |